(12) United States Patent
Schmier

(10) Patent No.: US 8,356,071 B2
(45) Date of Patent: Jan. 15, 2013

(54) PRESENTATIONAL SYSTEM AND METHOD FOR IP TELEPHONES AND OTHER DEVICES

(75) Inventor: Jacob Schmier, Phoenix, AZ (US)

(73) Assignee: Mitel Networks Corporation, Ottawa, Ontario (CA)

( * ) Notice: Subject to any disclaimer, the term of this patent is extended or adjusted under 35 U.S.C. 154(b) by 174 days.

(21) Appl. No.: 12/800,409

(22) Filed: May 14, 2010

(65) Prior Publication Data

US 2011/0282933 A1    Nov. 17, 2011

(51) Int. Cl.
*G06F 15/16* (2006.01)
(52) U.S. Cl. ......... 709/203; 715/200; 715/730; 715/731
(58) Field of Classification Search .......... 709/201–203; 715/200, 730, 732, 731, 761
See application file for complete search history.

(56) References Cited

U.S. PATENT DOCUMENTS

| | | | | |
|---|---|---|---|---|
| 5,877,741 | A * | 3/1999 | Chee et al. ..................... | 345/629 |
| 6,556,217 | B1 | 4/2003 | Maekipaa et al. | |
| 7,307,647 | B2 * | 12/2007 | Hatori et al. .................. | 345/698 |
| 7,480,858 | B2 * | 1/2009 | Chen et al. ..................... | 715/234 |
| 7,502,867 | B2 * | 3/2009 | Mitchell et al. ............... | 709/246 |
| 7,565,604 | B2 * | 7/2009 | Makela .......................... | 715/238 |
| 7,574,653 | B2 * | 8/2009 | Croney et al. ................. | 715/249 |
| 7,823,083 | B2 * | 10/2010 | Rohrabaugh et al. ......... | 715/815 |
| 7,831,926 | B2 * | 11/2010 | Rohrabaugh et al. ......... | 715/800 |
| 7,844,889 | B2 * | 11/2010 | Rohrabaugh et al. ......... | 715/200 |
| 7,944,456 | B2 * | 5/2011 | Seljavaara ...................... | 345/660 |
| 8,020,090 | B2 * | 9/2011 | Chen et al. ..................... | 715/238 |
| 8,024,659 | B2 * | 9/2011 | Tachibana et al. ............. | 715/738 |
| 8,045,510 | B2 * | 10/2011 | Yuan et al. ..................... | 370/328 |
| 2004/0117735 | A1 * | 6/2004 | Breen ............................ | 715/517 |
| 2004/0255232 | A1 | 12/2004 | Hammond et al. | |
| 2004/0266412 | A1 | 12/2004 | Maes et al. | |
| 2005/0015513 | A1 | 1/2005 | Tran et al. | |
| 2005/0138137 | A1 | 6/2005 | Encamacion et al. | |
| 2005/0144258 | A1 | 6/2005 | Burckart et al. | |
| 2007/0255811 | A1 * | 11/2007 | Pettit et al. .................... | 709/220 |
| 2011/0010629 | A1 * | 1/2011 | Castro et al. .................. | 715/732 |

FOREIGN PATENT DOCUMENTS

CA    2556777 A1    2/2008

* cited by examiner

*Primary Examiner* — Krisna Lim

(57) ABSTRACT

A system and method for providing a presentation to a display client. In one illustrative embodiment, the display client can be an IP phone. The presentation can be provided over a network from a central location without requiring end user action at the IP phone. The presentation can be modified for optimal display based on the capabilities of the specific IP phone without affecting the quality of the presentation for other device types. The devices capable of viewing the presentation can include desk display telephones, cellular telephones, smart phones, portable computers, PCs, and possibly other appropriate network-enabled devices. Centrally controlled presentations can be pushed to an individual device, group of devices, and/or all devices site-wide. In some applications, the display client can be used to provide user selections in response to the provided presentation.

14 Claims, 4 Drawing Sheets

PRESENTATIONAL SYSTEM AND METHOD FOR IP TELEPHONES AND OTHER DEVICES

TECHNICAL FIELD

This application generally relates to content, and more particularly, to distributing content from a central location to a client device without user action from the client device.

BACKGROUND

In today's electronics, IP phones and other similar devices typically incorporate web browsers. Through the web browser, a user can access the World Wide Web from almost any location. The user can utilize search engines, portals, aggregators, blogs, etc. to access an effectively unlimited store of information. Nevertheless, situations exist in which traditional web-based technologies can be unsuitable. For instance, there can be situations in which a user tries to contact a central provider for information. In response, the provider can assess the user's requests and provide suitable information to the user. In many cases, this assessment of a user's needs goes beyond what is reasonably possible with current search engines or similar applications.

For example, consider the case in which a hotel guest contacts the concierge for restaurant recommendations. The concierge can make inquiries of the guest as to the type of restaurant, number of guests, etc. The concierge can use their detailed knowledge of restaurants in the area to provide a recommendation to the guest that best suits their needs. The human sensitivity and intelligence that the concierge can bring to this task far exceeds the capabilities of any search engine.

Typically, the guest can make their inquiries over the telephone from their room. It would be desirable if the concierge could present the guest with various pieces of information that could possibly be in a multimedia format. The concierge could present the guest with images of the restaurant, the menu, recommendations by other guests, directions to the restaurant, etc. This information can be created and/or selected by the concierge and pushed out to the guest's device. Nonetheless, this behavior is contrary to current web technologies in which the web browser pulls information to it at the request of the user.

Previous solutions placed the burden of locating, identifying, and accessing the desired information on the end user. In a typical situation, the individual would be required to point a web browser to a specific URL and then enter a specific presentation ID and access code prior to being able to view the presentation. If the end user required assistance, it would be provided verbally or via electronic communication such as email.

Presentations that can be provided over networks are useful in many contexts. Difficulties can arise when the individual viewing the presentation has trouble in locating, identifying, and accessing a network-based presentation. These difficulties may include, but are not limited to, locating the server hosting the presentation, identifying the desired presentation within the server, accessing the presentation, and possibly maintaining synchronization of the presentation material with the pace of the presenter.

A need therefore exists for a system and method whereby information can be readily pushed to an IP phone or similar device while overcoming the above-described limitations as well as other limitations which will become apparent from the discussion below. In essence, this disclosure will describe a system and method whereby content can be created and distributed from a central location and pushed to a client device to achieve the efficiencies described above.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

Figure 1:
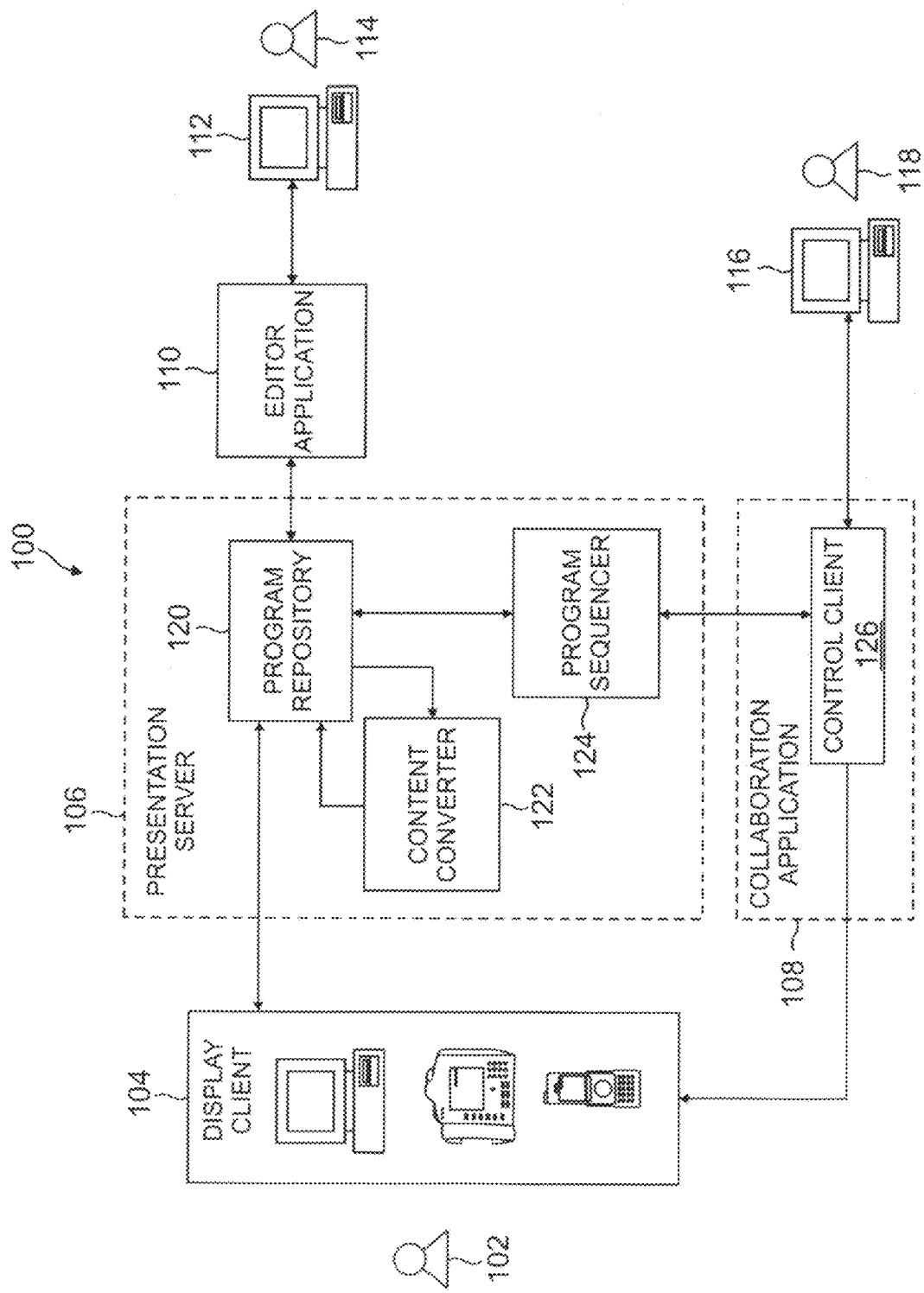
FIG. 1 is a block diagram illustrating exemplary components for a presentational system in accordance with one aspect of the present application.

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Overview

Generally described, the present application relates to content, and more particularly, to a presentational system and method for distributing content from a central location to a client device without user action from the client device. In an exemplary embodiment, content can be uploaded to a presentation server via an editor application. The presentation server can modify the content in accordance with configurations set by a display client. When requested, the presentation server can push the content to the display client. A program sequencer can be used to order the content and incorporate timing delays when presenting the content. A presenter can send a request to a control client so that the presentation server can push the content to the display client.

Illustratively, and in one application, the presentational system can be provided within a hotel so that specific images can be presented for display on the screens of telephones situated within guest rooms. The hotel phone, which can take the form of an IP phone, can include a relatively large screen with a good resolution. The phones can also have color displays. The hotel can benefit by placing advertisements and other information on these screens in such a way as to not require any guest intervention. In one embodiment, the menus of restaurants within the hotel can also be displayed along with images of selected dishes. Various guest facilities such as spas, business centers, etc. can also be presented to the guest through the phone. The hotel can also present images of artwork, scenic views of the area, etc. on the screen to enhance the ambience of the guest room and therefore the guest's perception of the quality of the hotel. The images can be pushed from a central location with no requirement for intervention of anyone at the user endpoint.

In another application, content can be pushed by an instructor from a central point to endpoints outside of the device operator's control. The instructor can plan a lesson and present material in a specific order. This can overcome the challenges that are provided in today's systems whereby it would be inefficient and undesirable to expect students to move through the slides at the instructor's direction. Through this application, the instructor can control the slides and pace of the presentation from a central location without requiring the students to access and log into a traditional web-based presentation site from their device.

As provided in the applications, content can be pushed over a network to device screens from a central location without requiring end user action at the device. The presentation can be modified for optimal display based on the capabilities of a specific device without affecting the quality of the presentation for any other device type. The devices can also be capable of simultaneously viewing the presentation. Centrally controlled presentations can be pushed to an individual device, group of devices, and/or all devices site-wide. Those skilled in the relevant art will appreciate that other embodiments exist and are within the scope of the present application. Further details regarding these embodiments as well as other features will become apparent from the discussion provided below.

Presentational System

FIG. 1 depicts a typical environment for the presentational system 100 in accordance with one aspect of the present application. Incorporated within the presentational system 100 can be a display client 104, presentation server 106, collaboration application 108 and editor application 110. Known to those skilled in the relevant art, fewer or more components can be used within the presentational system 100. The components described herein represent one embodiment and should not be construed as the only embodiment. Each of these components within the presentational system 100 will be described in more details below. While the term content is used, content can also be referred to as a program, presentation, multimedia, video, audio, slide, etc. within the present application. Each of the components described herein can be implemented in software, hardware, or a combination of both.

As shown, the presentational system 100 can include an editor application 110. The editor application 110 can allow individual programs to be authored and uploaded to a presentation server 106. Typically, a creator 114 uses the editor application 110 via a computing device 112. The editor application 110 can provide the creator 114 with the ability to author new content. The editor application 110 can allow the selection of one or more individual images, the associated sequencing, and specific timing requirements to be grouped together to create content.

When creating an individual presentation slide, the creator 114 can make modifications, such as adding or overlaying text on a selected image file. The editor application 110 can allow one or more presentation slides to be grouped together in a specific sequence and inter-slide timing requirements added to create a presentation program. The editor application 110 can also allow the program or slide to be uploaded, over a network, directly to the presentation server 106.

Figure 2:
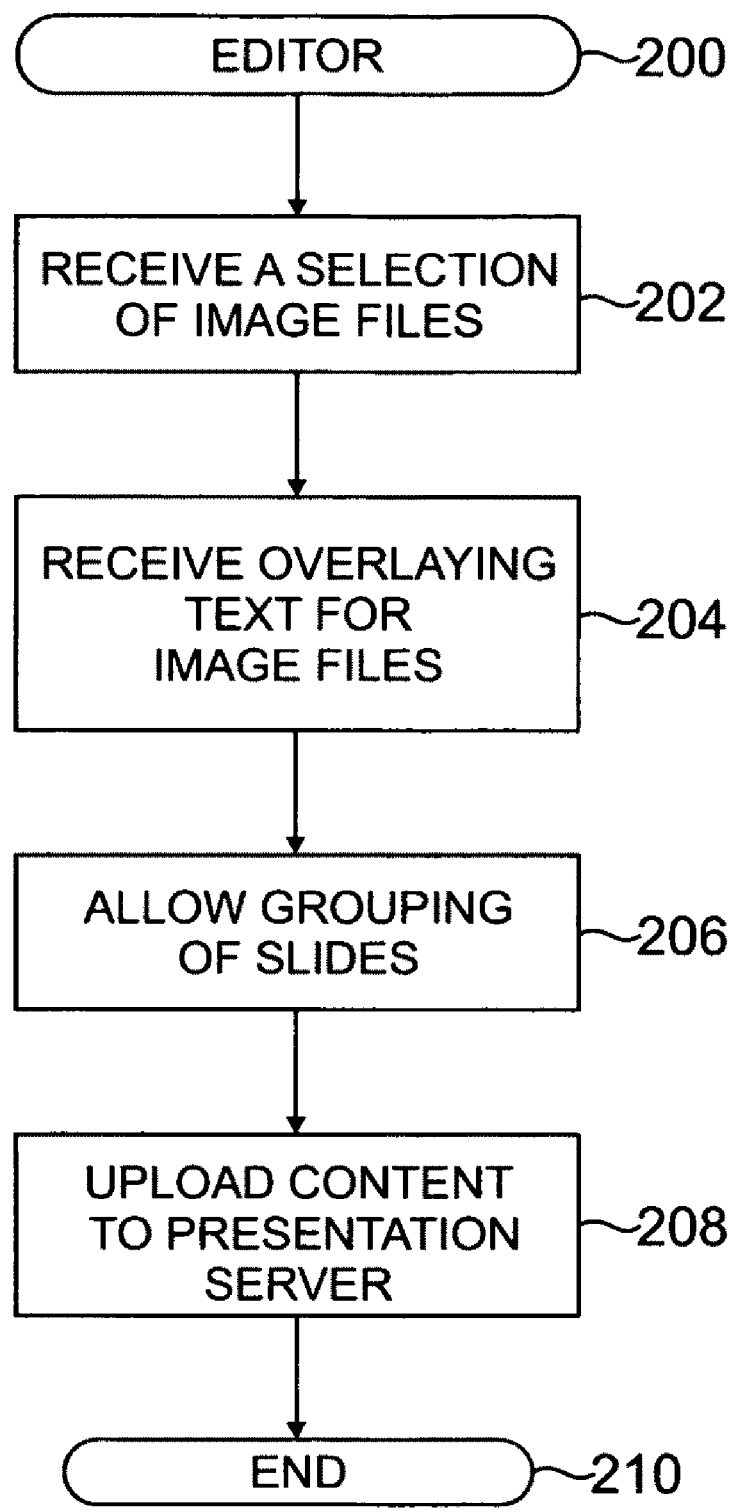
FIG. 2 represents exemplary processes performed to create and upload presentations in accordance with one aspect of the present application.

FIG. 2 provides exemplary processes for creating and uploading content into the presentational system 100 in accordance with one aspect of the present application. The processes can begin at block 200. At block 202, the editor application 110 can receive a selection of image files to generate a new presentation. The editor application 110 can allow the creator 114 to select image files stored in a format, e.g. JPEG, PDF, Postscript, etc., by accessing a suitable file structure.

Overlaying text for image files can be received by the editor application 110 at block 204. The combination of images and text can be used to generate content. In one embodiment, the creator 114 can make modifications to existing content instead of generating new content. For example, the creator 114 can add or overlay text on a previously stored image file. Known to those skilled in the relevant art, the overlying text can be styled in a variety of fonts and sizes.

At block 206, through the editor application 110, the creator 114 can group together the content in a specific sequence. In one embodiment, the editor application 110 can provide inter-slide timing requirements to create a presentation program. At block 208, the editor application 110 can allow the content to be uploaded, over a network, directly to the presentation server 106. The processes can end at block 210.

Returning to FIG. 1, the presentational system 100 includes a presentation server 106. The presentation server 106 can include three primary functional units i.e. the program repository 120, content converter 122, and the program sequencer 124. Fewer or more units can be used within the presentation server 106. Each of these units within the presentation server 106 will be described in more details below.

Figure 3:
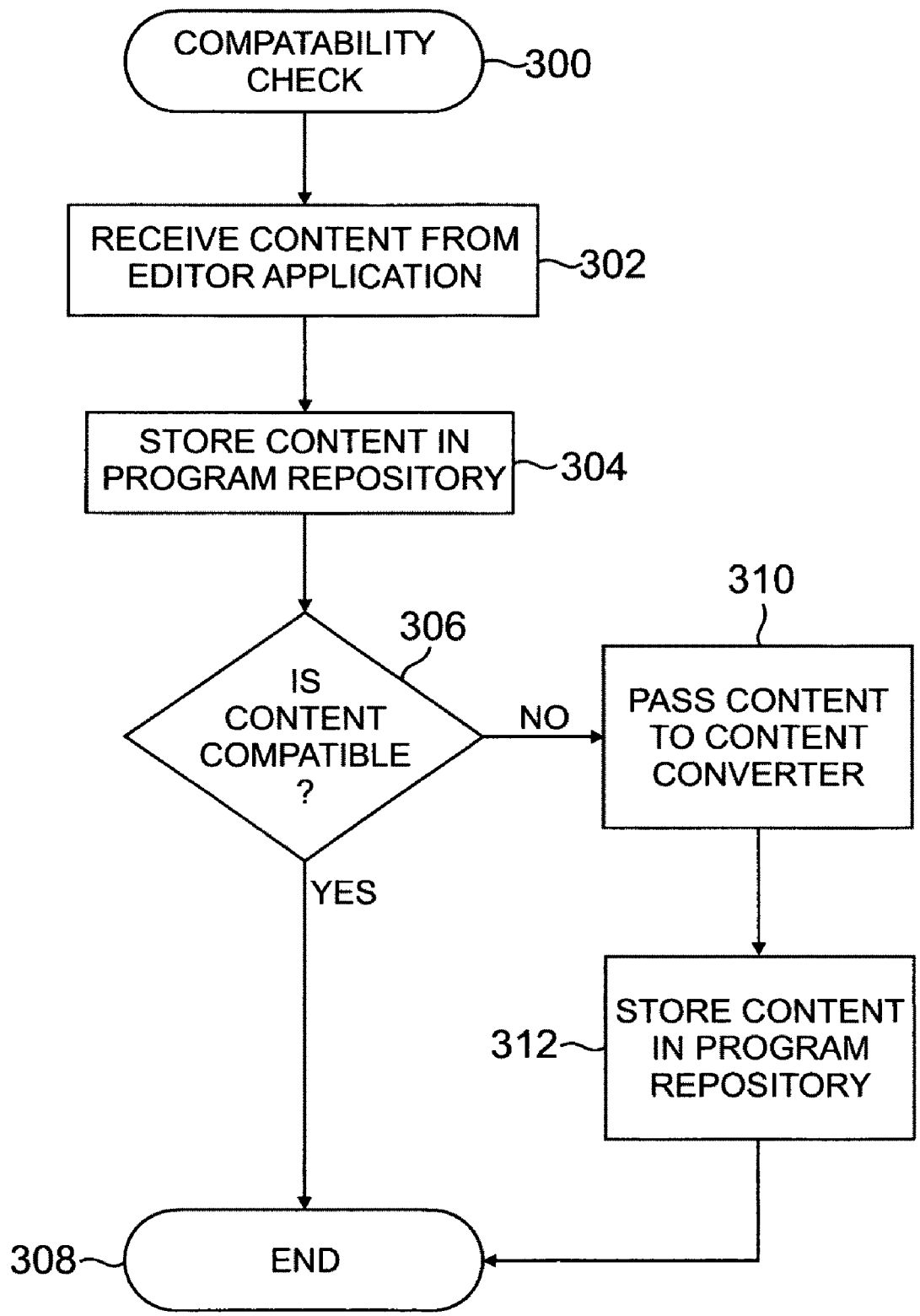
FIG. 3 depicts an exemplary flow chart for converting content so that it can be displayed to a viewer in accordance with one aspect of the present application.

The program repository 120 and the content converter 122, as will be shown in FIG. 3, can allow for the conversion of the incoming content so that it can be displayed to a viewer 102. The processes for the conversion can begin at block 300. When content is uploaded to the presentation server 106 by the editor application 110, the program repository 120 can receive the content at block 302. At block 304, the content can be stored within the program repository 120 to ensure that the original content is maintained.

At decision block 306, the program repository 120 can determine whether the received content should be modified to be compatible with the display client devices 104 maintained in a device compatibility list. The program repository 120 can maintain a list of devices on which information about display clients can be placed 104 and their capabilities for viewing programs from the presentation server 106. This list can allow modifications to be made to a program or slide via the content converter 122 at the time it is uploaded.

When the content is found to be compatible, the processes can end at block 308. If the content should be modified, however, the content can be passed to the content converter 122 at block 310. The content converter 122 can convert the content to an appropriate form before the content is passed back to the program repository 120. The content is typically received by the content converter 122 with accompanying compatibility information that provides guidelines on how the content is to be modified.

The content converter 122 can modify numerous types of content to be compatible with a display client 104. In one embodiment, when a presentation is received, the content converter 122 can modify each slide within the presentation.

On the other hand, when a single slide is received, the content converter 122 can modify the single slide. In one embodiment, modifications to the presentation can include adjusting the size, aspect ratio, resolution, and/or color palette of the slides. Those skilled in the relevant art will appreciate that the presentation can be modified in a number of different ways.

Upon receipt of a program or slide from the content converter 122, at block 312, the program repository 120 can store a copy of the modified content in a suitable file structure without affecting the original, unmodified version. Advantageously, storing the original content as well as the modified version can save processing time. The compatibility check processes can end at block 308.

The program sequencer 124 within the presentation server 106, as depicted in FIG. 1, can be responsible for maintaining the sequence of presentation slides within the content and inter-slide timing specified by the creator 114 via the editor application 110. The program sequencer 124 can present information on available presentation programs and content stored within the program repository 120 to the control client 126. In one embodiment, this information can include a general description of a program or slide, the number of slides within a program, the specific devices that a program or slide has been converted for use with, and/or a thumbnail image of a single slide or the first slide in a multi-slide program.

Continuing with FIG. 1, a number of display clients 104 can be coupled to the presentation server 106. In typical embodiments, the display client 104 can be placed on an end device such as a desk display telephone, a cellular telephone, or a PC. Other forms of display clients 104 can be placed on devices including smart phones, portable computers, or appropriate network enabled devices. In certain embodiments, display clients can be provided on an association of devices. In one example, a display screen such as a large screen television monitor can be associated with a telephone or other end device. In these embodiments, presentations can be pushed to the monitor for queries that have been initiated from the associated telephone or other end device. As shown, a viewer 102 can use the display client 104 for communicating with both the control client 126 within the collaboration application 108 and the presentation server 106 for the purpose of retrieving and displaying content that can include a presentation program or slide.

While a single viewer 102 was shown, those skilled in the relevant art will appreciate that a variety of implementations can be used. For example, the presentational system 100 can include multiple viewers 102 connected to multiple display clients 104. The display clients 104 can be separated and retrieve the content using different communication links from the presentations server 106.

The presentational system 100, as further depicted in FIG. 1, can include a collaboration application 108. The collaboration application 108 can include a control client 126 that can be used for communication with the presentation server 106. Generally described, the collaboration application 108 can refer to a control unit that notifies the presentation server 106 to send content. The presentational system 100 can also be connected to a presentation application, broadcast notification application, advertising application, or digital photo frame application, all of which can contain the control client 126. In one embodiment, the control client 126 can be a stand-alone unit.

The collaboration application 108 can be associated with a presenter 118. The presenter 118 can use the collaboration application 108, and more particularly the control client 126, to select and push content to one or more display clients 104. In one embodiment, the presenter 118 can interact with the collaboration application 108 through a computing device 116 as shown in FIG. 1. The control client 126 can retrieve information about the available presentation programs and slides from the program sequencer 124 within the presentation server 106 and provide this information to the presenter 118. In one embodiment, the information can be provided to the presenter 118 as a table of thumbnail images corresponding to the available presentation programs and slides. In one embodiment, additional information relating to each program or slide can appear next to the corresponding thumbnail image.

Components within the presentational system 100 can communicate with each other using logical connections. These logical connections can be achieved by a communication device coupled to or integral with the presentation server 106. The interactions between the components of the presentational system 100 can take place through a local area network (LAN), wide area network (WAN), personal area network (PAN), campus area network (CAN), metropolitan area network (MAN), or global area network (GAN). Such networking environments are commonplace in office networks, enterprise-wide computer networks, intranets and the Internet, which are all types of networks.

Figure 4:
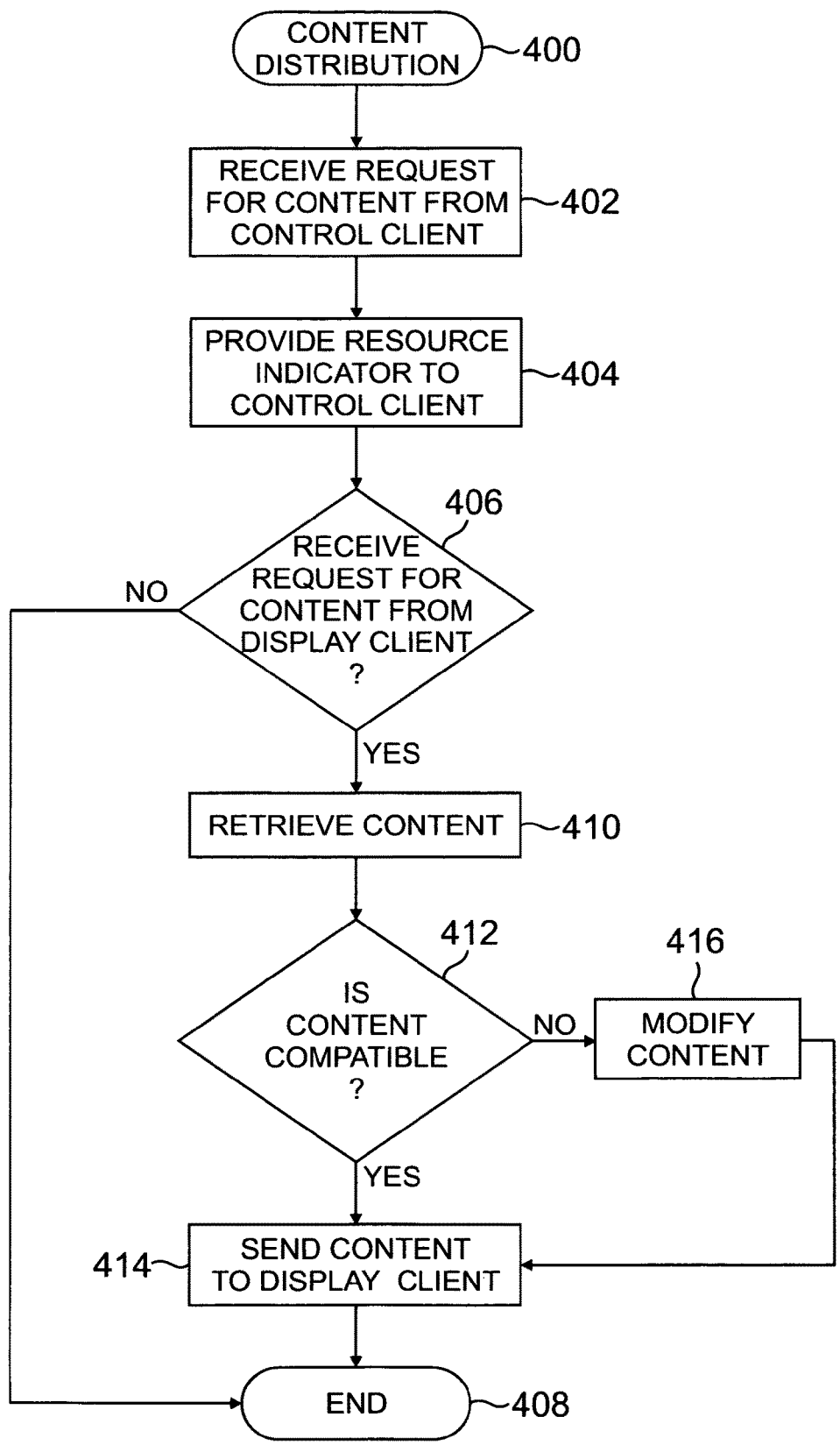
FIG. 4 shows a flow chart providing exemplary processes for distributing a presentation to the viewer in accordance with one aspect of the present application.

With reference now to FIG. 4, a flow chart representing exemplary processes for distributing a presentation to the viewer 102 in accordance with one aspect of the present application is provided. The processes for distributing content can begin at block 400. At block 402, a request can be received by the presentation server 106 for the content. In one embodiment, the request can be provided through the collaboration application 108. For example, when the presenter 118 selects a program or slide through the control client 126, a request can be sent to the program sequencer 124.

When the request is received, the program sequencer 124 can retrieve a resource identifier for the requested content. In one embodiment, the presenter 118 can request that a specific slide be sent. The presenter 118 can also request that the first slide in a multi-slide program be presented, which can typically occur when no slide has been specified. At block 404, the resource identifier can be sent to the control client 126 along with the number of the slide it corresponds to in the case of a multi-slide program. If inter-slide timing is present between the current slide and the next, the program sequencer 124 can initiate a countdown timer and, upon expiration of this timer, can automatically send the resource identifier for the subsequent slide to the control client 126. If the control client 126 is communicating with multiple display clients 104, this can allow the control client 126 to synchronize the advancement of the presentation program for the display clients 104.

When the display client 104 receives the resource identifier from the control client 126, the display client 104 can make a request for the content identified by the resource identifier from the program repository 120 within the presentation server 106. When the request is made, the display client 104 can provide the resource identifier. In one embodiment, the display client 104 can also send the name of the device and information related to its capabilities to the program repository 120. This information on the device's capabilities can include, but is not limited to, the display's size, resolution, and/or available color palette, processor speed, and/or available memory.

Because the display client 104 can be responsible for requesting the content specified by the resource indicator, in one embodiment, the viewer 102 can be provided with the ability to confirm or reject the sending of the request to the presentation server 106 to retrieve the appropriate content. At decision block 406, the presentation server 106 can determine whether a request for content has been made by the display client 104. The request from the display client 104 can contain information about the device issuing the request such as the device type and its capabilities. This can also allow a display client's 104 web browser to be leveraged for retrieving and displaying the presentation slide by having the display client 104 direct the web browser to a URL corresponding to the specified resource indicator. When the viewer 102 decides not to display the content, the processes for content distribution can end at block 408.

When the viewer 102 makes a request for content from the presentation server 106, the presentation server 106 can retrieve the content at block 410. Typically, the identifier can be used to determine which content was requested. When specific content has been requested, the program repository 120 can retrieve the requested content from the file structure. When specific content is not requested, the first slide within the content can be retrieved from the file structure.

At decision block 412, a determination can be made by the presentation server 106 whether the retrieved content is compatible with the requesting display client 104. The content can be compared against a device compatibility list that is maintained by the presentation server 106. If a modified copy of the content matching the capabilities of the requesting device can be retrieved from the file structure, it can be sent to the display client at block 414. If a modified copy matching the capabilities of the device cannot be retrieved from the file structure, the content can be sent to the display client 104 after first passing it through the content converter 122 at block 416, which allows modifications to be made to the slide at the time of the request. At block 408, the content distribution processes can end.

In one embodiment, and in response to the content displayed on the display client 104, a viewer 102 can provide user selections through the display client 104. For example, when the content displayed on the display client 104 advertises in-room dining options, the viewer 102 can select a specific lunch through the display client 104. Those skilled in the relevant art will appreciate that the display client 104 can provide a number of options for providing input.

Applications

In one operation, the viewer 102 and the presenter 118 can be engaged in some form of collaborative application 108. The collaborative application 108 can represent one way for a viewer 102 to obtain the presentation through their display client 104. The collaborative application 108 can take the form of a multimedia telephone call enabled by SIP (RFC 3261) or some other suitable rendezvous protocol. During the course of the interaction enabled by the telephone call, as represented in FIG. 1 by the connection between the display client 104 and the collaboration application 108, the viewer 102 can request some form of information from the presenter 118. In turn, the presenter 118 can push this information to the display client 104 for the viewer 102. In another form of operation, the presenter 118 can push information directly to the display client 104 for the viewer 102 without prior interaction through the collaborative application 108 and the display client 104.

The operations provided above can be used in a number of applications. For example, the collaborative application 108 can be used by a hotel guest requesting information on the hotel dining facilities from the concierge. To supplement the verbal description, the concierge, or the presenter 118 as shown in FIG. 1, can find it suitable to present the guest, or viewer 102, with images of the hotel menu, various dining rooms, etc. The presenter 118, in one embodiment, can access the collaboration client 108 through a computer 116, phone, or similar device. As shown, the viewer 102 can interact with a number of display clients 104 including a desk display telephone, a cellular telephone, a smart phone, a portable computer, a personal computer, or a network-enabled device.

The display client 104 can be capable of receiving and displaying images. The concierge's device, or as represented in this illustration as a collaboration application 108, can contain a control client 126 by means of which the concierge can be able to select a program of images to provide to the guest 102. This control client 126 can be part of a distinct collaborative program as shown in FIG. 1.

The control client 126 can allow the concierge to contact the presentation server 106 to select the most suitable program. Upon program selection, the concierge's control client 126 can obtain the identification of the program and, through the collaborative application 108, pass this information to the guest's display client 104. With this identification, the display client 104 can contact the presentation server 106 and request the indicated program. This request can contain an indication of the type of device and its capabilities that can be used to display the program to the guest 102.

The presentation server 106 can then extract the indicated program and send it to the viewer 102. When the display client's 104 type and capabilities are present in the request, the program can be passed through a content converter 122 to modify the image as necessary for display on the guest's device. Because programs can contain one or more images that are to be presented in sequence with specific timing requirements, the presentation server 106 can also contain a program sequencer 124 which can control the timing of the transmission of individual images to the display client 104 via communication with the control client 126.

The presentational system 100 can also be extended to a business setting. Business presentations can be deployed to targeted display clients 104 and/or all display clients 104 company-wide without requiring action by the associates viewing the presentation via these display clients 104. The presentations can be used in conjunction with conference calls or telecollaboration sessions. New employee orientation presentations can also be pushed to targeted display clients 104 to provide information to new hires.

Educational presentations can also be deployed to targeted student display clients 104 and/or all display clients 104 campus wide without requiring an action by the users of these display clients 104. The technology can be used to present course specific information and/or to present campus specific information for use in student orientation. The presentations can be used in conjunction with conference calls or telecollaboration sessions.

The presentational system 100 can be used as in-room advertising for venues within the hospitality industry. This can include, but is not limited to, hotels, motels, cruise ships and so on. This can be extended to venues in other industries in which guests or other residents will be served. This can include hospitals, student residences, rest homes and other homes for the aged. Deployed on display clients 104, the system 100 can present available amenities. Examples of the amenities can include images of the spa or restaurants with the extension to call for reservations, images of the golf course with the extension to call for a tee time, or images of current entertainment with the extension to call the box office for tickets. Those skilled in the relevant art will appreciate that numerous other types of amenities can be provided. A default presentation can be used as a form of screensaver to display scenic images and/or site specific advertising such as hotel services and specials in hospitality verticals. The system 100 can provide centrally controlled, targeted advertising for selected and/or all devices.

Deployed on a courtesy display client 104 or other device, the presentational system 100 can provide available products and services, current promotions, or other content tailored to meet a customer's needs in almost any market. In another application, the presentational system 100 can be setup for use as a digital photo frame. The users of the display client 104 can be granted access to an editor application 110, control client 126, and possibly their own presentation server 106 for the purpose of constructing a presentation program targeted at their specific device containing personal images rotated at specified intervals. This default presentation can be used as a form of screensaver.

The presentational system 100 can also be setup for use as a broadcast notification system where broadcast messages/images can be pushed to select and/or all devices without requiring any action by the end user. In addition to the examples already described in this disclosure, variations to the presentational system 100 can yield additional uses. Each of these modifications can be implemented by one skilled in the relevant art.

The presentational system 100 can be modified to give the presenter 118 the ability to allow individual viewers 102 to advance a presentation program at their own pace. More specifically, the display client 104 can be given the capability to request the presentation slide without requiring a subsequent resource indicator from the control client 126.

In one application, the presentational system 100 can be modified in order to provide an endless presentation program by looping the last presentation slide back to the first. The program sequencer 124 can handle this scenario by returning the resource indicator for the first presentation slide after the last presentation slide is reached.

The presentational system 100 can also be modified in order to provide the presentation server 106 the ability to retrieve real-time images from a security/surveillance camera and make them available as presentation slides. The program repository 120 can retrieve an image from the video feed of a CCTV security/surveillance camera and make it available by treating the image as a presentation slide by providing a resource indicator for the retrieved image.

In another application, the presentational system 100 can be modified in order to provide the creator 112 with the ability to upload presentation programs to the presentation server 106 via email. The program repository 120 can be modified in order to receive an email message containing a presentation program, presentation slide, or series of slides, extract the necessary information from the email as necessary to store the program or slide(s) in a suitable file structure, and then make the presentation available to the control client 126 via the program sequencer 124.

The presentational system 100 can be modified in order to provide the presentation server 106 the ability to access and display material stored in an online image hosting/sharing service. The program repository 120 can retrieve an image from an online image hosting/sharing service and make it available by treating the image as a presentation slide by providing a resource indicator for the retrieved image.

The presentational system 100 can also be modified in order to provide the viewer 102 with the ability to zoom in on a presentation slide and/or view the image in its original size. The display client 104 can be modified to provide the ability to dynamically resize the image to provide a zoom effect. In the case the image has undergone device specific modifications to adjust its size by the content converter 122, the display client 104 can be modified to retrieve a copy of the image in its original size from the program repository 120 and then display it on the device's screen achieving a zoom effect.

In another application, the presenter 118 can be provided with the ability to interrupt a presentation program in progress to display another and then return the viewer 102 to the original presentation program when finished. The control client 126 and program sequencer 124 can be modified to allow the presenter 118 the ability to pause a running program, select another program, and then return the viewer 102 to the original program when finished.

While the presentational system 100 is beneficial because it can leverage existing web browser technology in the supported devices, it can be modified to support a pure direct push technique for the presentation slides. The presentational system 100 can be modified to allow the control client 126 to retrieve the presentation slide indicated by the resource identifier and push the slide directly to the display client 104.

The presentational system 100 can also be modified to relate pre-determined activities with a specific presentation slide. Through this application, the system 100 can provide the viewer 102 the ability to request additional information, place a call to a specific number, communicate a preference with the presenter 118, or other action via touch screen event or key press on their device.

Systems, Methods, and Operations

In accordance with one aspect of the present application, a system is provided. The system can include an end device displaying a presentation. The presentation for display can be pushed by a centrally controlled network to the end device and sent when directed by a control client operated via a presenter. The centrally controlled network can modify the presentation for display based on capabilities available on the end device.

In one embodiment, the presentation can include at least one slide. In one embodiment, the slide can include at least one image and overlaying text. In one embodiment, the presentation can include a plurality of slides with timing delays scheduled between each slide when displayed. In one embodiment, a sequencer can control the timing delays.

In one embodiment, the presentation can be uploaded to the centrally controlled network by an editor application. In one embodiment, modifying the presentation can be performed by a content converter. In one embodiment, the centrally controlled network can include a repository for storing the presentation.

In accordance with another aspect of the present application, a server is provided. The server can include a repository storing a list of client devices and associated capabilities for viewing programs on the client devices. In addition, the server can include at least one processor. The server can also include a memory operatively coupled to the processor, the memory storing program instructions that when executed by the processor, causes the processor to perform processes.

The processes can include determining whether a client device is within the list of client devices stored in the repository. In addition, the processes can include modifying a program when the client device is within the list of client devices based on the associated capabilities for viewing programs. The processes can also include providing the program to the client device.

In one embodiment, the processes can include receiving the program from an editor application. In one embodiment, providing the program to the client device can include sending a first slide within the program. In one embodiment, providing the program to the client device can include sending a requested slide within the program.

In one embodiment, the processes can include receiving a request for the program by the client device. In one embodiment, the client device can be a desk display telephone, a cellular telephone, a smart phone, a portable computer, a personal computer, or a network-enabled device. In one embodiment, the processes can include receiving a request for the program by a control client for display on the client device.

In accordance with yet another aspect of the present application, a computer-implemented method for providing a presentation to a display client over a network is presented. The method can include receiving a resource identifier from a display client. In addition, the method can include retrieving content based on the resource identifier. The method can also include identifying settings for the display client and determining whether the content can be shown on the display client based on the settings. The method can include modifying the content dependent on the determination. The method can also include providing the content to the display client over the network.

In one embodiment, retrieving content can include accessing a repository. In one embodiment, the method can further include receiving the settings from the display client when the display client is connected to the network. In one embodiment, the method can further include allowing an end user to provide input through the display client in response to the content shown on the display client. In one embodiment, identifying settings for the display client can include matching the display client with a compatibility list.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A presentational system comprising:
an end device displaying a presentation;
a centrally controlled network comprising a presentation server and a collaboration application, wherein the presentation server and the collaboration application may be co-located or separately located;
wherein said presentation for display on said end device is provided by said centrally controlled network and sent when directed by a control client of said collaboration application operated via a presenter, said presentation being pushed out to the end device by said collaboration application without requiring action by a user of said end device, said centrally controlled network modifying said presentation for display based on capabilities available on said end device prior to sending said presentation.

2. The system of claim 1, wherein said presentation comprises at least one slide.

3. The system of claim 2, wherein said slide comprises at least one image and overlaying text.

4. The system of claim 1, wherein said presentation comprises a plurality of slides with timing delays scheduled between each slide when displayed.

5. The system of claim 4, wherein a sequencer controls said timing delays.

6. The system of claim 1, wherein said presentation is uploaded to said centrally controlled network by an editor application.

7. The system of claim 1, wherein modifying said presentation is performed by a content converter of said presentation server.

8. The system of claim 1, wherein said centrally controlled network comprises a repository for storing said presentation.

9. A presentation server comprising:
a repository (i) storing a list of client devices and associated capabilities for viewing content on said client devices and (ii) storing the content with associated identifiers;
at least one processor; and
a memory operatively coupled to said processor, said memory storing program instructions that when executed by said processor, causes said processor to:
receive, from a collaboration application that is separate from said client devices, a request for content for at least one client device;
provide, to the collaboration application, an associated identifier for the content of the request;
determine whether said at least one client device is within said list of client devices stored in said repository;
modify a content when said at least one client device is within said list of client devices based on said associated capabilities for viewing programs; and
provide said content to said at least one client device without requiring action from a user of said at least one client device.

10. The server of claim 9, wherein said memory storing program instructions, when executed by said processor, causes said processor to receive said program from an editor application.

11. The server of claim 9, wherein providing said program to said client device comprises sending a first slide within said program.

12. The server of claim 9, wherein providing said program to said client device comprises sending a requested slide within said program.

13. The server of claim 9, wherein said memory storing program instructions, when executed by said processor, causes said processor to receive a request for said program by said client device.

14. The server of claim 13, wherein said client device is at least one of a desk display telephone, a cellular telephone, a smart phone, a portable computer, a personal computer, and a network-enabled device.

* * * * *